United States Patent [19]

Hayashi et al.

[11] Patent Number: 4,654,800
[45] Date of Patent: Mar. 31, 1987

[54] CONTROL AND MONITORING APPARATUS FOR VENDING MACHINES

[75] Inventors: Yukichi Hayashi; Eiji Itako, both of Sakado; Masahiro Yasuhara, Iruma, all of Japan

[73] Assignee: Kabushikikaisha Nippon Coinco, Saitama, Japan

[21] Appl. No.: 700,646

[22] Filed: Feb. 12, 1985

[30] Foreign Application Priority Data

Feb. 20, 1984 [JP] Japan ................................. 59-29888
Feb. 20, 1984 [JP] Japan ................................. 59-29889

[51] Int. Cl.⁴ ....................... G06F 15/21; G07F 11/00
[52] U.S. Cl. ................................. 364/479; 364/403; 364/900; 340/825.35
[58] Field of Search ........ 364/400, 403, 464, 478–479, 364/900 MS File; 235/381, 385; 340/825.35, 825.36; 194/217

[56] References Cited

U.S. PATENT DOCUMENTS

| | | |
|---|---|---|
| 4,120,452 | 10/1978 | Kimura et al. ..................... 235/381 |
| 4,231,105 | 10/1980 | Schuller et al. ................. 364/479 X |
| 4,233,660 | 11/1980 | Fagan ............................... 364/479 X |
| 4,282,575 | 8/1981 | Hoskinson et al. ................. 364/479 |
| 4,369,442 | 1/1983 | Werth et al. ..................... 340/825.35 |
| 4,381,835 | 5/1983 | Shah et al. ....................... 364/479 X |
| 4,412,292 | 10/1983 | Sedam et al. ....................... 364/479 |
| 4,512,453 | 4/1985 | Schuller et al. ................. 364/479 X |
| 4,553,211 | 11/1985 | Kawasaki et al. ................... 364/479 |

Primary Examiner—Gary V. Harkcom
Attorney, Agent, or Firm—Koda and Androlia

[57] ABSTRACT

Sales management data such as sold product number data, sales data, unsold product number data, unit price data and sales condition data of a vending machine and individual columns are stored. When a given column and given sales management data are selected, the given column is displayed on a column display unit, and the sales management data of the given column is displayed on a data display unit. The sales management data can be set or updated. When a failure occurs in the vending machine, a failure position is displayed on the data display unit.

18 Claims, 19 Drawing Figures

FIG. 3A

| MODE ADDRESS \ COLUMN ADDRESS | 0 | 1 ($C_1$) | 2 ($C_2$) | 3 ($C_3$) | 4 ($C_4$) | n ($C_n$) |
|---|---|---|---|---|---|---|
| 0 ($L_0$) | 156780 | 1200 | 4000 | 4000 | 3360 | ...... |
| 1 ($L_1$) | 250 | 20 | 40 | 50 | 48 | ...... |
| 2 ($L_2$) | — | 80 | 60 | 50 | 52 | ...... |
| 3 ($L_3$) | — | 60 | 100 | 80 | 80 | ...... |
| 4 ($L_4$) | — | 100 | 100 | 100 | 100 | ...... |
| 5 ($L_5$) | (0~9) | 0 | 1 | 0 | 0 | ...... |
| 6 ($L_6$) | — | 0 | 0 | 1 | 1 | ...... |
| 7 ($L_7$) | 5 | — | — | — | — | ...... |
| 8 ($L_8$) | 30 | 0 | 1 | 1 | 1 | ...... |
| 9 ($L_9$) | — | 1 | 0 | 0 | 0 | ...... |

| ADDRESS | FAILURE NUMBER |
|---|---|
| 0 | 1 or 0 |
| 1 | 1~5, 7~9 |
| 2 | 1~5, 7~9 |
| ⋮ | ⋮ |
| n | 1~5, 7~9 |
| n+1 | 1 or 0 |

| ADDRESS (FAILURE NUMBER) | DATA |
|---|---|
| 1 | 1 or 0 |
| 2 | 1 or 0 |
| ⋮ | ⋮ |
| r | 1 or 0 |

| ADDRESS (FAILURE NUMBER) | DATA |
|---|---|
| 1 | 1 or 0 |
| 2 | 1 or 0 |
| 3 | 1 or 0 |

T4

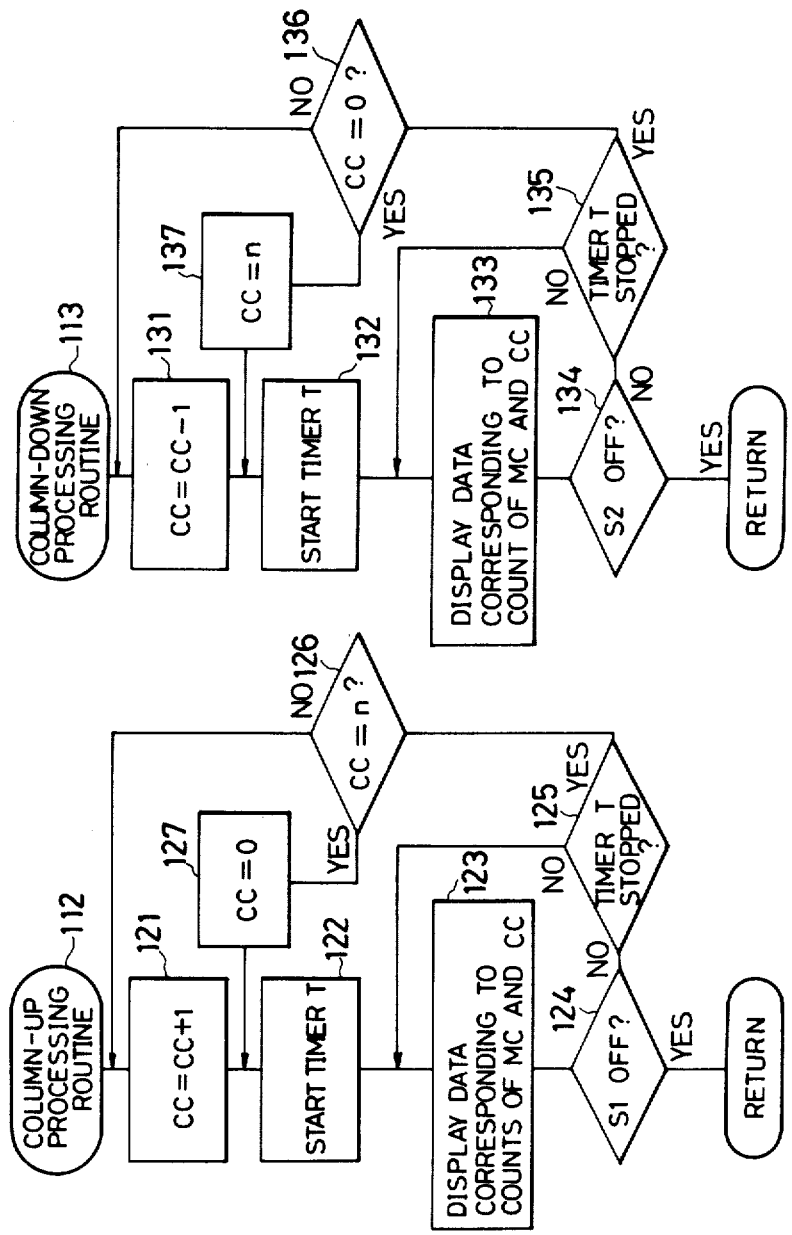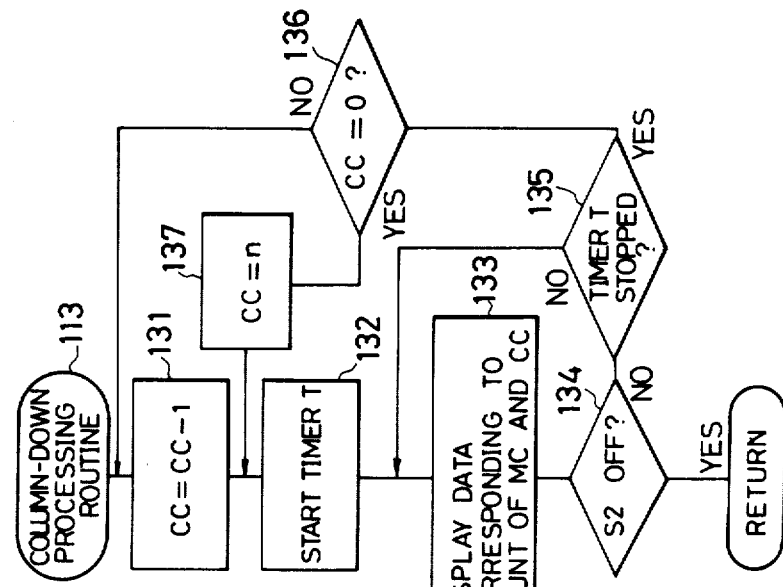

CONTROL AND MONITORING APPARATUS FOR VENDING MACHINES

BACKGROUND OF THE INVENTION

1. Field of the Invention

The present invention relates to a vending machine for automatically selling products upon insertion of coins and, more particularly, to a control apparatus for a vending machine for displaying different sales data of the vending machine.

2. Description of the Prior Art

A conventional vending machine is known where the number of products sold is stored therein and displayed thereon. The most advanced vending machines have a plurality of columns storing different products for sale. However, in a conventional vending machine, sales management data such as the number of products sold for each column cannot be stored or displayed.

SUMMARY OF THE INVENTION

It is a first object of the present invention to provide a control apparatus for a vending machine, wherein sales management data such as total sales and the number of products sold in units per column in the vending machine can be stored and displayed.

It is a second object of the present invention to provide a control apparatus for a vending machine, wherein sales management data such as a sales price of products stored in each column in the vending machine can be set and checked.

It is a third object of the present invention to provide a control apparatus for a vending machine, wherein a failure position in the vending machine is displayed on a display unit for displaying sales management data.

In order to achieve the above objects of the present invention, there is provided a control apparatus for a vending machine, including storage means for storing sales management data for controlling total selling in the vending machine and selling in each column, i.e., sales management data such as total sales, the number of products sold, the number of unsold products, the unit price, the sales discount, continuous selling and group selling; column selecting means for selecting the entire vending machine and each column; sales management item selecting means for selecting management items of the sales management data; a column display unit for displaying a column selected by the column selecting means; a data display unit for displaying the sales management data; and control means for reading out from the storage means data associated with an item selected by the sales management item selecting means and with the column selected by the column selecting means, thereby displaying sales conditions and selling states of the entire vending machine and each column on the column display unit and the data display unit. The control apparatus further includes input means for setting or updating the sales management data stored in the storage means, such as sales conditions. The storage means has a failure table for storing failure positions. When a failure occurs in the vending machine, a failure check mode is set by failure check selecting means. A proper failure position is read out from the failure table and is displayed on the column and data display units.

As described above, since the sales management data such as total sales and the number of products sold can be stored for the entire vending machine and each column, total sales can be easily calculated, and demand for the respective products in the corresponding columns can be more easily known. Therefore, products stored in the respective columns can be selected in accordance with the current demand. Furthermore, since the number of sold and unsold products for each column can be displayed, the delivery schedule can be made more efficient, and the number of products to be delivered can be more precisely known.

Furthermore, since the sales conditions such as a unit price, continuous selling or discount selling of the products can be set for each column, and the sales condition data can be displayed in units per column, the sales conditions can be checked in units per column. In addition, specific sales conditions such as different unit prices, products subjected to continuous selling, and products subjected to discount selling can be selected in accordance with the products and the type of sale. Therefore, a variety of sales applications can be provided in the vending machine. The display units for displaying the sales management data such as sales conditions for the respective columns only comprise a column display unit and a data display unit for displaying the sales management data. Therefore, all sales management data can be displayed in units per column. In addition to this advantage, a failure position in the vending machine can be displayed on the column display unit and the data display unit, thereby providing a low-cost control and monitoring apparatus for the vending machine.

BRIEF DESCRIPTION OF THE DRAWINGS

FIGS. 3A, 3B, 3C and 3D are a management table, a system failure table, a CM failure table, and a BV failure table, respectively;

FIG. 5 is a flow chart showing a column-up processing subroutine;

FIG. 6 is a flow chart showing a column-down processing subroutine;

DETAILED DESCRIPTION OF THE PREFERRED EMBODIMENT

Figure 1:
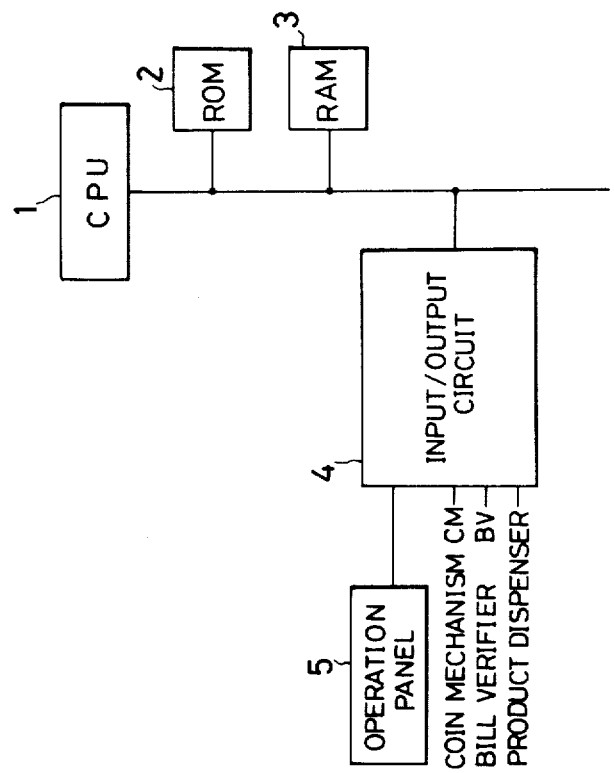
FIG. 1 is a block diagram of a control apparatus for a vending machine according to an embodiment of the present invention.

FIG. 1 is a block diagram of a control apparatus for a vending machine according to an embodiment of the present invention. Referring to FIG. 1, reference numeral 1 denotes a central processing unit (to be referred to as a CPU hereinafter) for controlling the overall operation of the vending machine; 2, a ROM for storing a control program for controlling the vending machine; 3, a RAM for storing processed data and a vending machine management table to be described later; and 4, an input/output circuit. The input/output circuit 4 is connected to the operation panel 5 shown in FIG. 2, a coin mechanism CM for receiving inserted coins and for dispensing small change, a bill verifier BV and a product dispensing mechanism.

Figure 2:
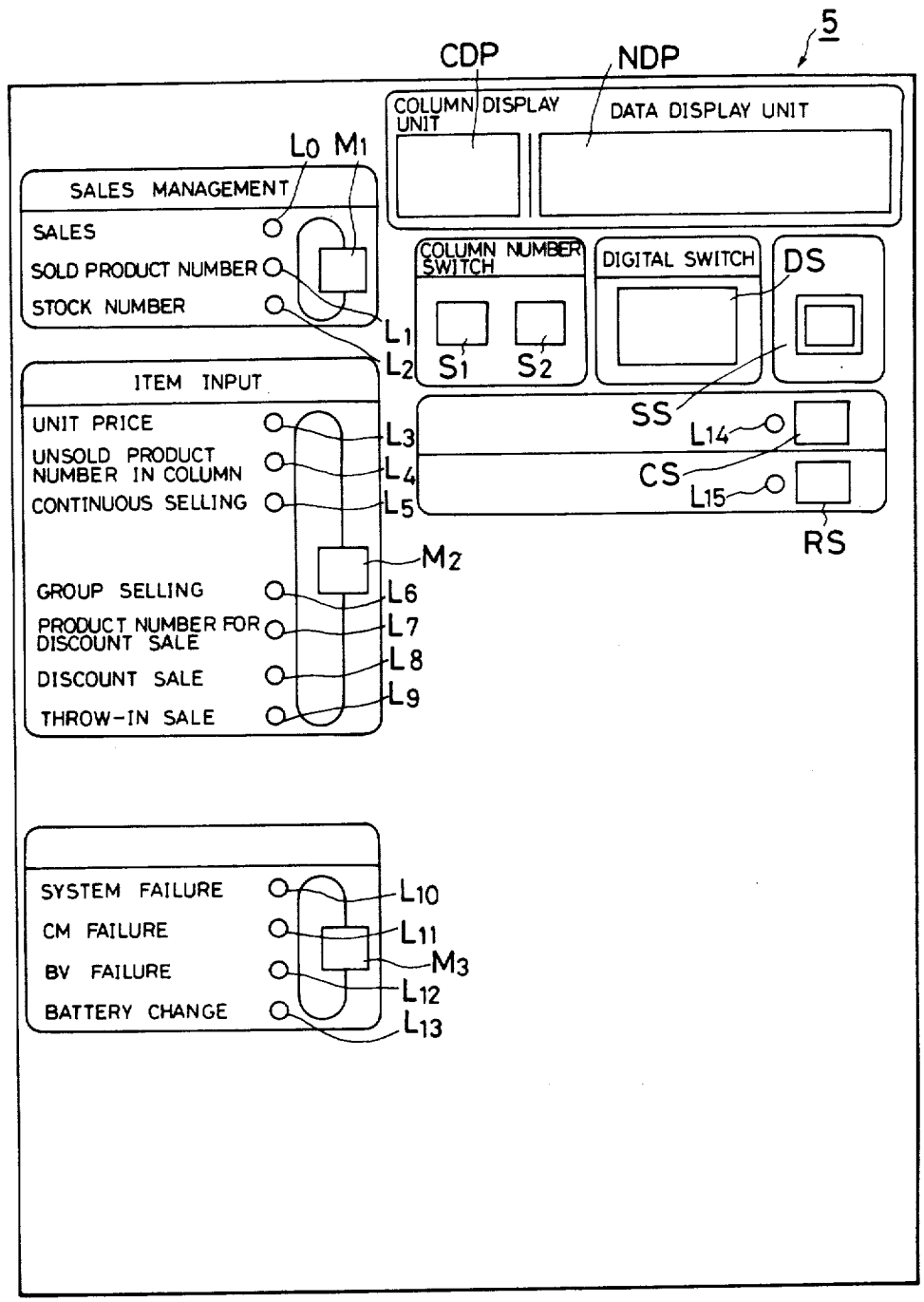
FIG. 2 is a plan view showing an operation panel of the control apparatus of FIG. 1.

As shown in FIG. 2, the operation panel 5 has: a column display unit CDP for displaying column numbers of product storage columns in the vending machine; a data display unit NDP for displaying different numerical data; and column selection switches for selecting a column number displayed on the column display unit CDP. The column selection switches comprise a column-up switch S1 for incrementing the column number and a column-down switch S2 for decrementing the column number. Reference symbol DS denotes a digital switch for manually entering 4 digits from 0 to 9 so as to enter different data. A set switch SS is arranged to store 4-digit data entered by the digital switch DS in a table (to be described later) in the RAM 3. Reference symbols M1 to M3 denote mode switches. The mode switch M1 is used to set the control apparatus in the sales management mode. The mode switch M2 is used to set the apparatus in the item input mode for setting preset values of the different items. The mode switch M3 is used to set the apparatus to the failure check mode for checking a failure in the vending machine. Reference symbols L0 to L13 denote indicator lamps, respectively. The indicator lamp L0 is turned on when the sales display mode is selected in the sales management mode. The indicator lamp L1 is turned on when the sold product number display mode is selected. The indicator lamp L2 is turned on when the unsold product number display mode is set. The indicator lamps L0 to L2 are sequentially turned on to select the sales, sold product number and unsold product number display modes each time the sales management mode switch M1 is depressed. Similarly, the indicator lamps L3 to L8 are sequentially turned on to select the corresponding modes every time the item input mode switch M2 is depressed. The indicator lamp L3 indicates the unit price input mode for entering unit price data of products stored in each product storage column. The indicator lamp L4 indicates a column storage mode for setting the number of products to be stored in each product storage column. The indicator lamp L5 indicates a continuous selling mode for selling products in accordance with the number of stored products and the size of the product dispensing port upon insertion of the corresponding coins and/or bills. The indicator lamp L6 indicates group selling for grouping the columns for storing the same type of products at the same unit price so as to equally dispense the products from the respective columns. The indicator lamp L7 indicates a discount product number input mode for entering the number of products to be discounted or subjected to issuance of a discount coupon when the products are bought in a large quantity. The indicator lamp L8 indicates a discount sales input mode for entering a discount price when a customer has a win in a vending machine with a roulette wheel or when the discount product number mode is set. The indicator lamp L9 indicates a throw-in sales mode for setting a throw-in sale when the consumer has a win in the vending machine with a roulette wheel or the like. The indicator lamps L3 to L9 are sequentially selected to set the corresponding modes upon each depression of the item input mode switch M2.

The indicator lamp L10 is turned on when a system failure occurs in the vending machine. The system failures are summarized in Table 1. When a failure is detected, the indicator lamp L10 is turned on when the failure check/cancel mode switch M3 selects the failure check mode since the failure positions are stored in the system failure table. One of the failure numbers in Table 1 is displayed on the data display unit NDP.

TABLE 1

| Failure No. | Item | Contents |
| --- | --- | --- |
| 0 | CM communication failure | Failure in communication with coin mechanism |
| 1 | Product jam | Failure in operation of carrier switch |
| 2 | Convey failure 1 | Column selection relays 1 to 8 are not turned on |
| 3 | Convey failure 2 | Group selection relay is not turned on |
| 4 | Convey failure 3 | Column selection relays 1 to 8 are not turned off |
| 5 | Convey failure 4 | Group selection relay is not turned off |
| 6 | System failure | Failure in fuse in relay box and data in ROM |
| 7 | Flap failure | Flap switch is kept on |
| 8 | Delivery failure | Delivery switch is kept on |
| 9 | Shoot failure | Shoot switch is kept on |

When a failure occurs in the coin mechanism CM, the CM failure lamp L11 is turned on. When the failure check/cancel mode switch M3 selects the CM failure mode, one of failure numbers in Table 2 is displayed on the data display unit NDP.

TABLE 2

| Failure No. | Contents |
| --- | --- |
| 1 | ¥ 500 coin switch is kept on |
| 2 | ¥ 100 coin switch is kept on |
| 3 | ¥ 50 coin switch is kept on |
| 4 | ¥ 10 coin switch is kept on |
| 5 | Safety switch is kept off |
| 6 | Return switch is kept on |
| 7 | Pulse switch is kept on |
| 8 | Charge dispensing failure (jam, carrier switch failure, double failure of ¥ 10 tube) |

Similarly, when a failure occurs in the bill verifier BV, the BV failure lamp L12 is turned on to set the BV failure mode. One of failure numbers in Table 3 is displayed on the data display unit NDP.

TABLE 3

| Failure No. | Contents |
| --- | --- |
| 1 | ¥ 1000 return signal is kept high |
| 2 | ¥ 1000 authentic signal is kept high |
| 3 | Internal failure of bill verifier |

The indicator lamp L13 is turned on when a voltage at a battery is low, indicating that a replacement is needed.

Reference symbol CS denotes a clear switch for clearing the total sales and the total number of products sold when sales management is performed. When the clear switch CS is depressed, the indicator lamp L14 is turned on and the total sales, the individual sales for the respective columns, the total number of products sold, and the individual numbers of products sold for the respective columns which are stored in a management table T1 (to be described later) of the RAM 3 are cleared to zero. Reference symbol RS denotes an unsold or stocked product reset switch. When the stocked product reset switch RS is depressed, the indicator lamp L15 is turned on. The number of products (stocked in each column) which is stored in the management table T1 to be described later is stored in a stock column of the management table T1.

FIG. 3A shows a management table T1 for storing sales management data in the RAM 3. Mode addresses 0 to 9 correspond to the indicator lamps L0 to L9, respectively. The total sales of the vending machine and the individual sales in units of columns are stored at the mode address 0. Every time a product is sold in the vending machine, a current sale is added to the previous sales in one of the column addresses 1 to n which corresponds to the column storing the product sold. The mode address 1 accesses a memory area for storing the number of products sold. The total number of currently sold products for the vending machine and the individual numbers in units of columns are stored at column addresses 0 and 1 to n, respectively.

The mode address 2 accesses a memory area for storing the number of products currently stocked in each column in the vending machine. Each time a product is sold, the stock number data at the corresponding column address is decremented by one, thereby storing the current stock number. In this case, no data is stored at the column address 0, so a total number of stocked products is not stored.

The mode addresses 3 to 9 are accessed by the item input mode switch M2. The mode addresses 3 to 9 correspond to the modes indicated by the indicator lamps L3 to L9, respectively. The memory areas at the mode addresses 3 to 9 store data of the entire vending machine and data of the respective columns upon operation of the column-up and column-down switches S1 and S2 and the set switch SS.

A data access method will be described wherein data is read out from the management table T1 and the input data is written therein.

When the sales management switch M1 is depressed to set the apparatus in the sales mode, the indicator lamp L0 is turned on. At the same time, the CPU accesses the column address 0. When the column-up and column-down switches S1 and S2 are selectively operated to display a column number on the column display unit CDP, the CPU 1 accesses the column address corresponding to the displayed column number. For example, when "0" is displayed on the column display unit CDP, the CPU 1 reads out data "156780" (FIG. 3A) stored at the column address 0 and the mode address 0. The data "156780" is displayed on the data display unit NDP, displaying that the total sales of the vending machine are "¥156780". When the column-up or column-down switch S1 or S2 is operated to change the display to, for example, "1" on the column display unit CDP, the individual sale of the first column is displayed as "1200", i.e., M1200 on the data display unit NDP. Thereafter, the column-up and column-down switches S1 and S2 are selectively used to select a desired column number to be displayed on the column display unit CDP, and the sales of the selected column are displayed on the data display unit NDP. Similarly, when the sales management mode switch M1 is depressed to set the apparatus in the sold product number display mode, the indicator lamp L1 is turned on. The CPU 1 accesses the mode address 1 and reads out the sold product number data corresponding to a column selected by the column-up or column-down switch S1 or S2 in accordance with the column number displayed on the column display unit CDP. As a result, the sold product number data of the selected column is displayed on the data display unit NDP. When the column number is updated to "0", the total number of products sold (i.e., 250 in the case of FIG. 3A) is displayed on the data display unit NDP. When the unsold product number display mode is set, the indicator lamp L2 is turned on. The CPU 1 reads out the unsold product number from the management table T1 in accordance with the column number displayed on the column display unit CDP. The readout data is then displayed on the data display unit NDP.

When the item input mode switch M2 is depressed and the unit price mode is set, the indicator lamp L3 is turned on. The CPU 1 reads out the current unit price from the management table in accordance with a column number which is accessed at the mode address 3 upon selective operation of the column-up or column-down switch S1 or S2 and which is displayed on the column display unit CDP. The readout unit price data is displayed on the data display unit NDP. As shown in FIG. 3, the unit price "60" for column 1 or "100" for column 2 is displayed on the data display unit NDP. Therefore, the current unit price of the products stocked in each column can be checked. In order to update the current unit price, a corresponding column number is displayed on the column display unit CDP. A new unit price is entered at the digital switch DS, and the set switch SS is depressed. The CPU 1 fetches the updated value from the digital switch DS and writes the updated value in a memory area at the column address corresponding to the column number displayed on the column display unit CDP. The updated value is also displayed on the data display unit NDP. In this manner, the unit price can be updated in units of columns. The number of unsold products in each column can be checked and updated in the same manner as described above. When an item input mode switch M2 is depressed to set the apparatus in the column replenishment number mode, the lamp L4 is turned on. When a desired column number is displayed on the column display unit CDP, the CPU 1 reads out the column replenishment number from the management table T1 in response to the displayed column number. The readout data is displayed on the data display unit NDP. The number of products to be stocked in the corresponding column is entered by the digital switch DS, the set switch SS is depressed, and the set value is stored in a memory area in the management table.

When continuous selling is preset, the item input mode switch M2 is depressed to set the apparatus in the continuous selling mode, thereby turning on the indicator lamp L5. A display content on the column display unit CDP is reset to zero and a maximum number representing the number of products subjected to continuous selling is entered by the digital switch DS. When continuous selling can be performed up to an amount of inserted coins and/or bills without limiting the number of products to be sold, "0" is entered by the digital switch DS. When the set switch SS is then depressed, the value "0" entered by the digital switch DS is stored at the mode address 5 and the column address 0 in the management table T1 of FIG. 3A. The CPU 1 checks whether or not continuous selling can be performed in units of columns upon selective operation of the column-up and column-down switches S1 and S2. More particularly, when the value 0 is entered by the digital switch DS and the set switch SS is depressed, data "0" is stored at the corresponding memory area of the management table T1. This column can be subjected to continuous selling. In this manner, the column can be selectively set in a limited or unlimited sales mode. When a given column is not subjected to continuous selling but single product selling, value "1" is entered by the digital switch DS and the set switch SS is depressed. Data of "1" is stored in the management table, and the corresponding column is subjected to only single product selling.

Group selling will be described wherein identical products having the same price are stored in a plurality of columns and are equally dispensed from these columns.

The lamp L6 is turned on to set the apparatus in the group selling mode. A group selling column is displayed on the column display unit CDP. A group number including a column having the displayed column number is entered by the digital switch DS and the set switch SS is depressed. The entered group number is stored in a memory area at the column address of the group selling mode address of the management table. A group number including the group selling columns is stored in each column subjected to group selling. In the management table in FIG. 3A, the third and fourth columns belong to the first group. The column data of "0" represents a column which is not a group selling column.

A method of setting a discount sale will be described hereinafter.

The different types of discount sales shown in Table 4 can be performed in accordance with combinations of the contents in Table 4.

TABLE 4

| Discount condition | Discount product number setting | Discount sale setting | |
|---|---|---|---|
| | | Discount price setting | Column setting |
| 1. A sale with a throw-in is made when a customer has a win | Set to 0 | Set to ¥0 | Set throw-in sale column |
| 2. A discount sale is made when a customer has a win | | Set to ¥10 to ¥90 | Set discount sale column |
| 3. A discount coupon is issued when products are purchased in a large quantity | Set to 1 to 9 | Set to ¥0 | Set discount sale column |
| 4. A discount sale is made when products are purchased in a large quantity | | Set to ¥10 to ¥90 | Set discount sale column |

In order to set the control apparatus to sell a product with a throw-in (a specific product) when a consumer has a win in a vending machine with a roulette wheel, the indicator lamp L7 is turned on to set the discount product number mode. A value "0" is displayed on the column display unit CDP. The mode address 7 and the column address 0 of the management table are accessed, and a value "0" is entered by the digital switch DS. The set switch SS is then depressed to store the value "0" at the selected address 0. The value "0" indicates that the discount product number is zero. The indicator lamp L8 is turned on to set the apparatus in the discount sales mode. The display content on the column display unit CDP is set to zero to select the column address 0. Data of "0" is stored at the mode address 8 and the column address 0 (the discount price is zero in this case). The indicator lamp L9 is then turned on to set the apparatus in the throw-in sale mode. Data of "1" is set in a memory area of the column subjected to a throw-in sale. In the case of FIG. 3A, the sale with a throw-in is made for the products stored in column 1.

In order to make a discount sale when the consumer has a win on the roulette wheel, the discount product number is set to zero. A discount price is set at the column address 0 in the discount sale mode (the mode address 8). The throw-in sale mode is set, and data of "1" is stored at the address of the column subjected to a discount sale when the consumer has a win on the roulette wheel. Furthermore, when a discount coupon is to be issued or a discount sale is made for a consumer who buys products in a large quantity, the discount product number is stored at the mode address 7 and the column address 0. In the case of FIG. 3A, data of "5" is stored at the mode address 7 and the column address 0. The apparatus is set in the discount sale mode, and data of "0" is stored at the column address when a discount coupon is issued. However, when a discount sale is performed, an amount to be discounted, e.g., ¥30 of FIG. 3A is stored. Data of "1" is stored at the address of the column subjected to the discount sale. When the number of products subjected to discount sale exceeds the preset discount product number, the predetermined amount is subtracted from the total amount and change representing the discounted amount is dispensed.

FIG. 3B shows a system failure table T2 arranged in the RAM 3. When a failure occurs in communication with the coin mechanism CM, as indicated by the failure number 0, the CPU 1 stores data of "1" at the address 0 of the system failure table. When failures represented by the failure numbers 1 to 5 occur in the columns 1 to n, the corresponding column numbers are selectively stored at the addresses 1 to n. When data trouble occurs in the fuse ROM of the relay box, data of "1" is stored at the address n+1. When a failure actually occurs and the failure number data is stored in the system failure table, the indicator lamp L10 is turned on. When the mode switch M3 is depressed, the indicator lamp L10 flashes. The CPU 1 accesses the system failure table. The failure column number and the failure number are displayed on the column display unit CDP and the data display unit NDP, respectively.

It should be noted that the CPU 1 directly checks the switch states and causes the data display unit NDP to display the failure numbers 7, 8 and 9.

When a failure occurs in the coin mechanism CM or the bill verifier BV, the CPU 1 causes the indicator lamp L10 or L11 to turn on. Data of "1" is stored at addresses of the CM failure table T3 (FIG. 3C) and the BV failure table T4 (FIG. 3D) which correspond to the one of the failure numbers 1 to 8 of Table 2 and one of the failure numbers 1 to 3 of Table 3, respectively. When the mode switch M3 is depressed, the data of "1", i.e., the corresponding failure numbers stored at the above addresses are displayed on the data display unit NDP.

When the battery voltage drops, the indicator lamp L12 is turned on.

The above description is of the general operation of the control apparatus for the vending machine according to the present invention. Sales management processing, item input processing, item input/check processing and failure check/cancel processing will be described in more detail with reference to FIG. 4.

Figure 4:
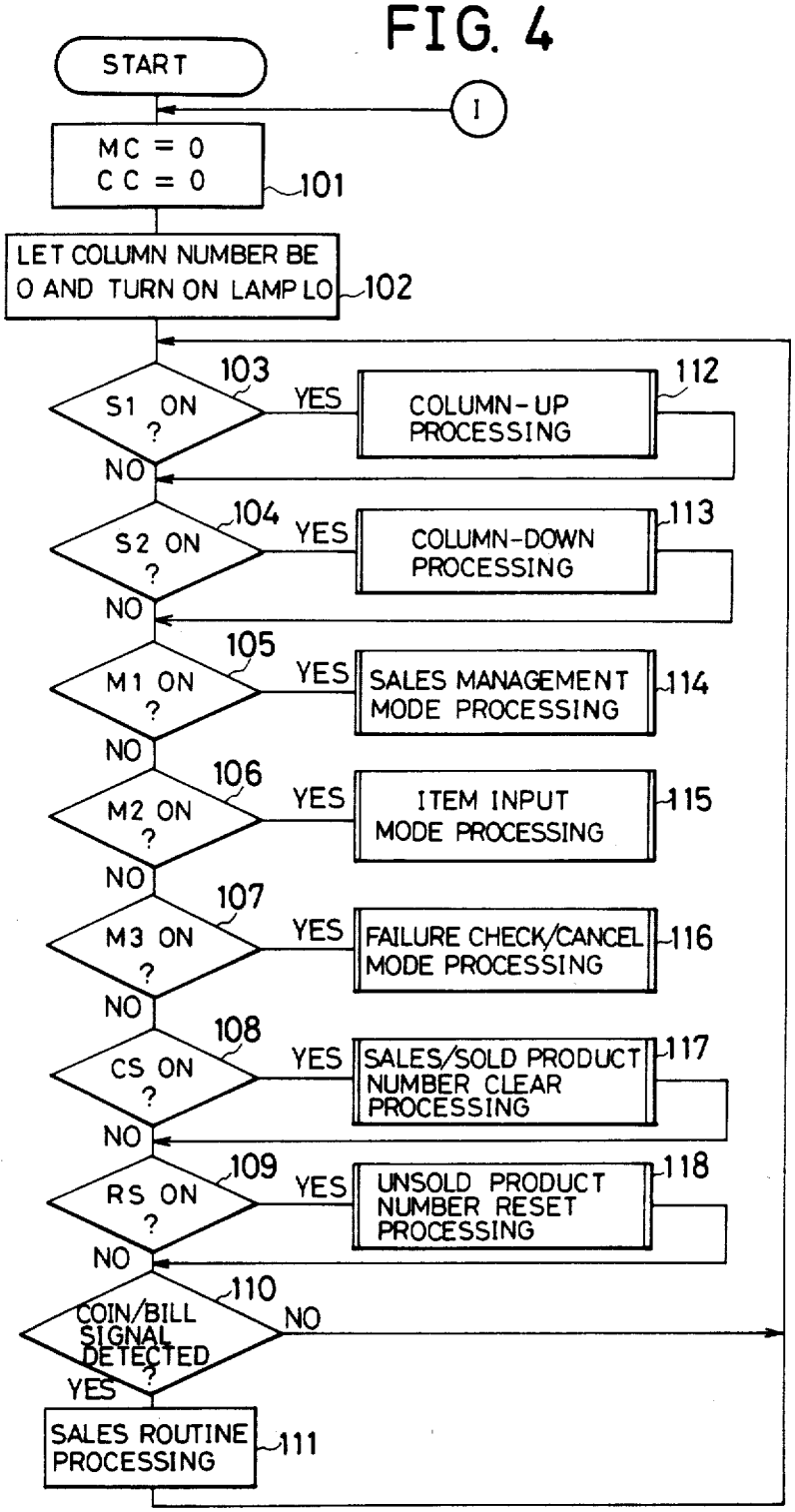
FIG. 4 is a flow chart showing a main routine when the apparatus is set in the standby mode.

Referring to FIG. 4, when the power switch of the control apparatus is turned on, the control apparatus is set in the standby mode. The CPU 1 resets a mode counter MC and a column counter CC to zero (step 101). The count of the mode counter MC corresponds to the data at the mode address of the management table T1 and one of the indicator lamps L0 to L9. The count of the mode counter MC accesses the corresponding mode address of the management table T1, and the corresponding indicator lamp is turned on. The count of the column counter CC corresponds to a column address of the management table and accesses the corresponding column address. The accessed column number is displayed on the column display unit CDP. The CPU 1 reads out the data accessed by the mode address 0 and the column address 0 of the management table T1 which respectively correspond to the count "0" of the mode counter MC and the count "0" of the column counter CC. The readout data, i.e., sales of the vending machine are displayed on the data display unit NDP. In this case, the count (i.e., 0) of the column counter CC is displayed on the column display unit CDP (step 102). The CPU 1 then checks whether or not the column-up and/or column-down switch S1 or S2 is depressed, whether the mode switch M1, M2 or M3, the clear switch CS, and the unsold product number reset switch RS are depressed, and whether or not the coin/bill insertion signal is generated from the coin mechanism CM (steps 103 to 110). When the coin/bill insertion signal is detected, sales subroutine (step 111) is started, and thereafter steps 103 to 110 are sequentially performed. However, when the CPU 1 detects that the column-up and/or column-down switch S1 or S2, one of the mode switches M1 to M3, the clear switch CS and the reset switch RS are depressed, column-up (step 112) or column-down (step 113) processing, sales management mode processing (step 114), item input mode processing (step 115), failure check/cancel mode processing (step 116), total sales/sold product number clear processing (step 117), and unsold product number reset processing (step 118) are performed, respectively. When the column-up switch S1 is depressed, column-up processing shown in FIG. 5 is performed. More particularly, the count of the column counter CC is incremented by one (step 121) (since the current count of the column counter CC is "0", the count is updated to "1"). A timer T is started (step 102). Data stored at the mode address 0 and the column address 1 which respectively correspond to the count (currently "0") of the mode counter MC and the count (currently "1") of the column counter are read out and displayed on the data display unit NDP. In the case of FIG. 3A, 1200 is displayed on the data display unit NDP. At the same time, since the count (i.e., "1") of the column counter CC is displayed on the column display unit CDP (step 123), sales of the first column are 1200 in accordance with the display contents on the column and data display units CDP and NDP. The CPU 1 then checks whether or not the column-up switch S1 is turned off (step 124). If YES in step 124, the flow returns to the main routine of FIG. 4. However, if NO in step 124, the CPU 1 waits until the timer T is stopped (step 125). When the CPU 1 determines that the timer T is stopped, the CPU 1 checks whether or not the count of the column counter CC has reached a maximum column number n (step 126). If NO in step 126, the operation of step 121 and subsequent steps is repeated. However, if YES in step 126, the column counter CC is set to zero, and the operation of step 122 and subsequent steps is performed. In this manner, when the column-up switch S1 is kept ON, the column number displayed on the column display unit CDP is sequentially incremented. The data for the column number displayed on the column display unit CDP is read out from the management table T1 and is displayed on the data display unit NDP. Therefore, the total sales of the vending machine and the individual sales of the respective columns can be easily obtained and sales management is efficiently performed.

When the column-down switch S2 is depressed, column-down processing shown in FIG. 6 is performed. This processing is substantially the same as the column-up processing of FIG. 5. Differences between column-up processing and column-down processing are represented by step 131 where the count of the column counter CC is decremented and steps 136 and 137 where the count of the column counter CC is set to the maximum column number n when the count of the column counter CC is zero. The individual sales data of the respective columns are displayed on the data display unit NDP in the same manner as column-up processing.

Figure 7:
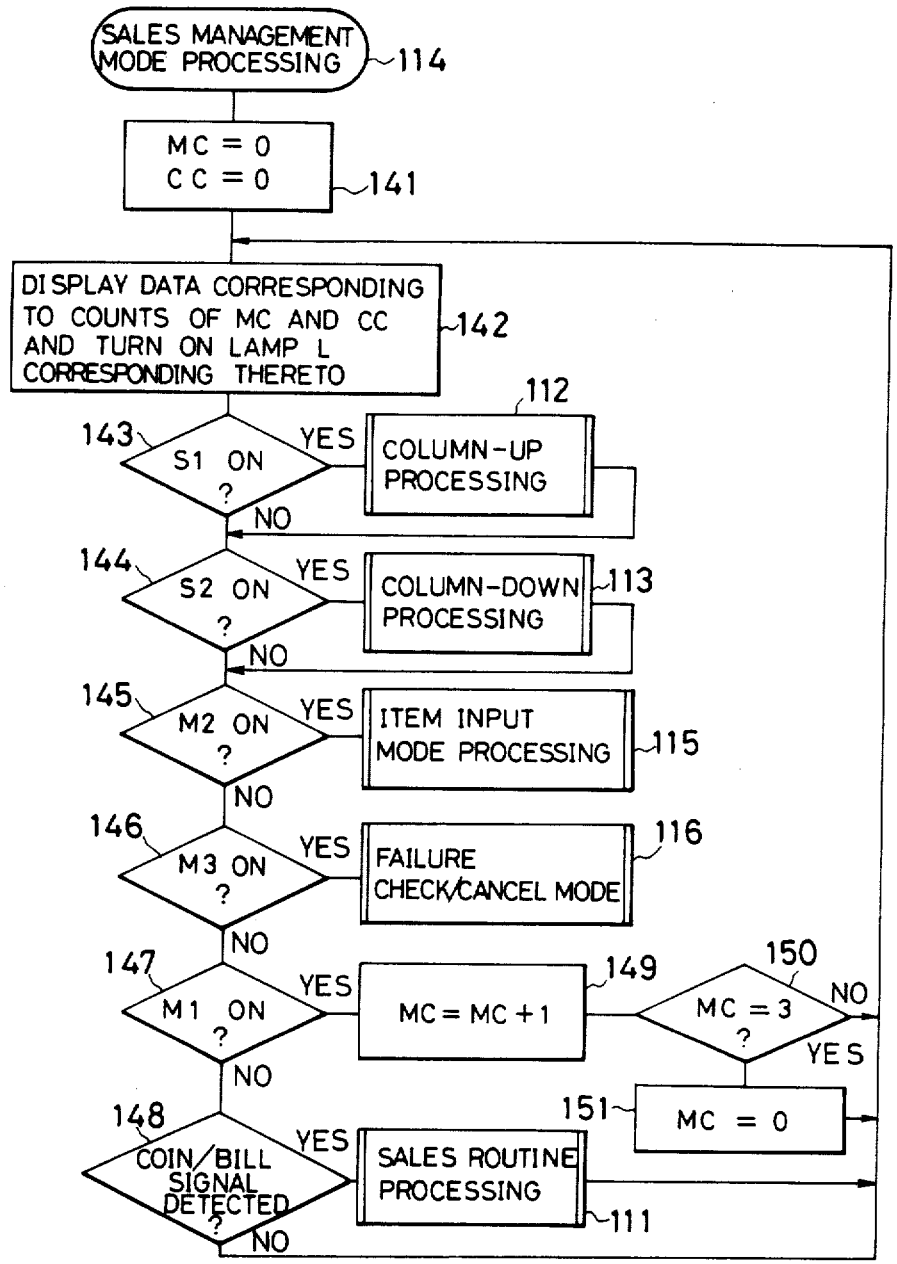
FIG. 7 is a flow chart showing a sales management mode processing subroutine.

Sales management mode processing will be described with reference to FIG. 7 when the sales management mode switch M1 is depressed in step 105.

When the sales management mode switch M1 is depressed, the mode counter MC and the column counter CC are reset to zero (step 141). The lamp L0 corresponding to the count of the mode counter MC is turned on to set the apparatus in the sales display mode. The count (i.e., "0") of the column counter CC is displayed on the column display unit CDP. The data at the mode address 0 and the column address 0 which respectively correspond to the counts of the mode counter MC and the column counter CC are read out from the management table and are displayed on the data display unit NDP (step 142). This step is the same as the operation in step 102. When the column-up or column-down switch S1 or S2 is depressed (step 143 or 144), the column-up or column-down processing of FIGS. 5 or 6 is performed to display the individual sales of the respective columns. When the mode switch M2 or M3 is depressed, the item input mode processing (step 115) or the failure check/cancel mode processing (step 116) is performed as described with reference to the main routine of FIG. 4. When the sales management mode switch M1 is depressed again (step 147), the CPU 1 increments the count of the monitor counter MC by one (step 149). When the CPU 1 determines that the count of the mode counter MC is not "3", the operation of step 142 and subsequent steps is repeated. However, when the CPU 1 determines that the count of the mode counter MC is "3", the count of the mode counter MC is reset to "0", and then the operation of step 142 and subsequent steps is performed. When the count of the mode counter MC is incremented by one so that the current count thereof is "1", the lamp L1 is turned on to set the apparatus in the sold product number display mode. Data at the mode address 1 of the management table is selected and displayed on the column display unit CDP. A column address of the management table T1 which corresponds to the displayed column number is selected to read out the sold product number data from the management table T1. The readout data is then displayed on the data display unit NDP. When the column display unit CDP displays data of 0, the data display unit NDP displays "250" in the case of FIG. 3A. When the column-up or column-down switch S1 or S2 is depressed, column-up processing (step 112) of FIG. 5 or column-down processing (step 113) of FIG. 6 is performed. The column counter CC is incremented (step 121) or decremented (step 131), and the updated count is displayed on the column display unit CDP. The sold product number data corresponding to the displayed column number is read out from the management table T1 and is displayed on the data display unit NDP (steps 123 and 133). In the case of FIG. 3A, when the column-up counter S1 and the column-down counter S2 are continuously depressed, the column numbers 0, 1, 2, . . . and n are sequentially displayed on the column display unit CDP, and the sold product number data 250, 20, 40, . . . are sequentially displayed on the data display unit NDP. The individual sold product numbers of the respective columns can be sequentially displayed, so that stock control can be performed easily.

Furthermore, when the sales management mode switch M1 is depressed, the count of the mode counter MC becomes "2" (step 149). The CPU 1 accesses the mode address 2. When the column-up or column-down switch S1 or S2 is depressed (step 143 or 144) to increment or decrement the count of the column counter CC, the sequentially updated column numbers are displayed on the column display unit CDP. In accordance with the processing shown in FIGS. 5 or 6, the mode address 2 and the column address corresponding to the column number counted by the column counter CC are selected, so that data stored at the address of the management table T1 is displayed on the data display unit NDP. In the case of FIG. 3A, when the count of the column display unit CDP is sequentially changed in the order of 1, 2, 3, . . . , the data display unit NDP sequentially displays 80, 60, 50, . . . which are respectively the unsold product numbers of the first column, the second column, the third column, . . . .

Furthermore, when the sales management mode switch M1 is depressed, the count of the mode counter MC is updated to "3". The mode counter MC is then reset to "0" (step 151), and the operation of step 142 and subsequent steps is performed. More specifically, each time the sales management mode switch M1 is depressed, the lamps L0 to L2 are sequentially turned on. A given sales management mode is selected by an ON indicator lamp. Thus, the operation of step 142 and subsequent steps is performed.

When the input signal is fetched by the CPU 1 from the coin mechanism in the sales management mode (step 148), a selling subroutine is performed (step 111), and the operation of step 142 and subsequent steps is repeated again.

The above describes processing in the sales management mode. Even in the main routine of FIG. 4 or the sales management mode of FIG. 7, when the item input mode switch M2 or the failure check cancel mode switch M3 is depressed (step 106 or 107, or step 145 or 146), the item input mode switch processing or the failure check/cancel mode processing is started.

Figure 8:
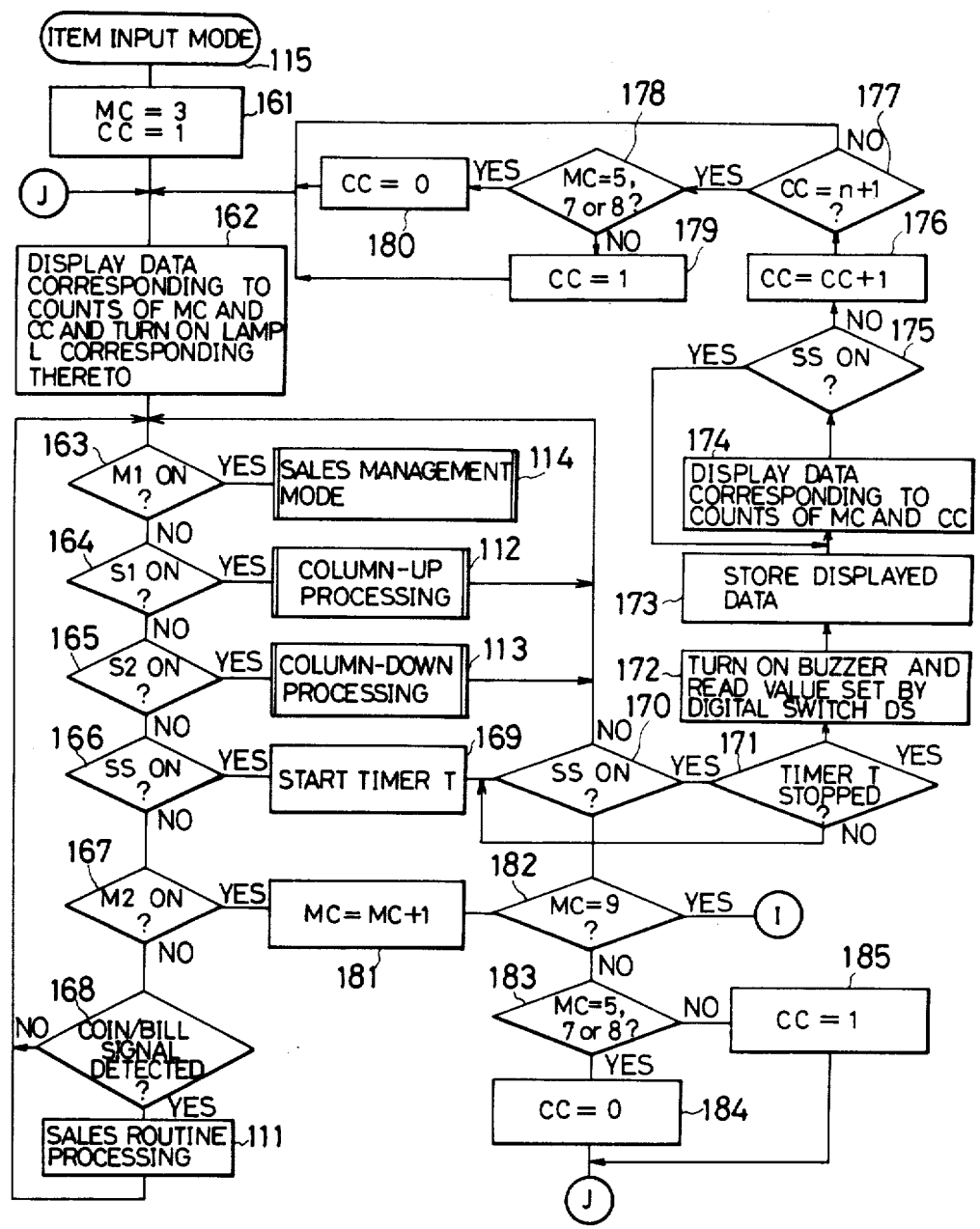
FIG. 8 is a flow chart showing an item input mode processing subroutine.

For example, when the item input mode switch M2 is depressed (step 106 or 145) and item input mode processing is started, the item input mode subroutine of FIG. 8 is initiated. The count of the mode counter MC is set to "3", and the mode address 3 of the management table T1 is accessed, so that the apparatus is set in the unit price input mode to turn on the indicator lamp L3. The count of the column counter CC is set to "1", and data of "1" is displayed on the column display unit CDP. At the same time, data at the column address 1 is accessed, so that the unit price data stored at the mode address 3 and the column address 1 of the management table T1 is displayed on the data display unit DNP (e.g., in the case of FIG. 3A, "60" is displayed on the data display unit NDP) (steps 161 and 162).

The CPU 1 then checks whether or not the mode switch M1, the column-up and column-down switches S1 and S2, the mode switch M2 and the like are depressed (step 163 to 167). The CPU 1 then checks in steps 168 whether or not the signal is supplied from the coin mechanism CM. If YES in step 168, the selling operation is performed (step 111) and the CPU 1 determines whether or not the operations in steps 163 to 168 have been performed.

When the CPU 1 determines that the column-up and column-down switches S1 and S2 are depressed, column-up processing (step 112) and column-down processing (step 113) are performed. In this case, the unit price data for the products stored in the respective columns are read out from the memory area at the mode address 3 of the management table and are displayed on the data display unit NDP.

In order to update or change a unit price, a column number corresponding to the products subjected to a price change is detected upon operation of the column-up or column-down switch S1 or S2 and is displayed on the column display unit CDP. A unit price to be updated is entered by the digital switch DS and the set switch SS is depressed (step 166), so that the timer T is started. When the set switch SS is kept depressed for longer than a predetermined period of time (step 170 and 171), the CPU 1 causes the buzzer to generate a buzzer sound. At the same time, the CPU 1 fetches the value set by the digital switch DS (step 172). This value is stored at the column address corresponding to a count (i.e., the value displayed on the column display unit CDP) of the column counter CC and at the mode address 3 (step 173). The updated unit price is displayed on the data display unit NDP (step 174). When the set switch is turned off (step 175), the count of the column counter CC is incremented by one (step 176). When the count of the column counter CC does not exceed by one the maximum column number n of the vending machine (step 177), the operation of step 162 and subsequent steps is performed. However, when the count of the column counter CC is "n+1", and the count of the mode counter MC is 5, 7 or 8 (step 178), the count of the column counter CC is reset to "0" (step 180). Otherwise, the count of the column counter CC is reset to "1" (step 179), and the operation of step 162 and subsequent steps is performed. In this manner, the count of the column counter CC is updated, and the updated unit price is entered by the digital switch DS. Thereafter, the set switch is depressed for the predetermined period of time, and the updated unit price is stored in the management table T1. Thus, the unit price of each column can be updated.

When the item input mode switch M2 is depressed (step 167), the count of the mode counter MC is incremented by one (step 181). For example, when the count of the mode counter MC is "4", the mode address 4 is accessed so as to check and change the number of products stored in each column.

Since the count of the mode counter MC is not "9", "5", "7" or "8" (steps 182 and 183), the count of the column counter CC is reset to "1", and the operation of step 162 and subsequent steps is performed. When the column-up or column-down switch S1 or S2 is depressed to perform column-up processing (step 112) or column-down processing (step 113), the number of products left in the column whose number is displayed on the column display unit is displayed on the data display unit NDP. If the operator wishes to change the number of products stored in each column, the number of products to be stored in the corresponding column is entered by the digital switch DS, and the set switch SS is depressed (step 166), and the operations in steps 169 to 180 are performed. The entered data is stored at the accessed column address and at the mode address 4 of the management table.

When the item input mode switch M2 is depressed (step 167), the count of the mode counter MC is "5" (step 181), and the mode address 5 in the management table T1 is accessed. In this case, the continuous selling check/input mode can be set. When the count of the mode counter MC is set to "5" (steps 182 and 183), the count of the column counter CC is set to "0" (step 184), and the indicator lamp 5 is turned on. Column number data of "0" is displayed on the column display unit CDP. The data (i.e., the number of products subjected to continuous selling) is read out from a memory area at the mode address 5 and the column address 0 and is displayed on the data display unit NDP (step 162).

When the number of products subjected to continuous selling is to be changed, a desired number is entered by the digital switch DS, and the set switch SS is depressed (step 166). Thereafter, when the operation of step 169 and subsequent steps is performed, updated data is written at the mode address 5 and the column address 0.

In the same manner as described above, the column-up or column-down switch S1 or S2, the digital switch DS and the set switch SS are operated to set to "0" the column number subjected to continuous selling. The other column numbers are set to "1". Therefore, the products stored in the columns having the column address "0" can be continuously sold up to the number set at the mode address 5 and the column address 0. Thus, the setting/updating of continuous selling is performed.

When the item input mode switch M2 is depressed (step 167), the count of the mode counter MC is updated to "6" (step 181). The mode address 6 is accessed to set the apparatus in the group selling mode. The count of the column counter CC is set to "1" (steps 182, 183 and 185), and the operation of step 162 and subsequent steps is performed. In this case, the column-up or column-down switch S1 or S2, the digital switch DS and the set switch SS are operated such that the identical type of products stored in different columns at the single unit price are grouped so as to sell the products equally from these different columns, and the group numbers, e.g., 1, 2, 3, . . . are entered for the respective columns. However, when some columns are not subjected to group selling, the column number of these columns is set to "0". In the case of FIG. 3A, data "0" is stored at the column addresses 1 and 2 and at the mode address 6, and data "1" is stored at column addresses 3 and 4. The products stored in the first and second columns are sold independently of each other and are not grouped. The third and fourth columns belong to the same group, so that the products stored therein are equally dispensed therefrom.

The discount sale mode will be described hereinafter.

When the item input mode switch M2 is depressed, the count of the mode counter MC is updated to "7", and the indicator lamp L7 is turned on. The column number "0" is displayed on the column display unit CDP. The content stored at the mode address 7 and the column address 0 is read out and displayed on the data display unit NDP. Therefore, the current number of products subjected to discount sale can be checked. If the operator wishes to update the number of products subjected to the discount sale, the operation can be performed in accordance with Table 4. When a sale with a throw-in is performed upon a win at the roulette wheel, data of "0" is entered by the digital switch, and the set switch SS is depressed (step 166), and the input data is stored at the mode address 7 and at the column address 0. However, when a customer purchases the products in large quantity and a discount coupon is issued or a discount price is offered, the number of products subjected to the issuance of the coupon or the offer of the discount price is entered by the digital switch DS and set by the set switch SS. The input data is stored at the mode address 7 and at the column address. When the item input mode switch M2 is depressed (step 167), the count of the mode counter MC is updated to "8", and the discount sale mode is set. In this mode, the count of the column counter CC is set to "0", and the indicator lamp L8 is turned on. The column number "0" is displayed on the column display unit CDP. The data stored at mode address 8 and at the column address 0 is displayed on the data display unit NDP. Data of "0" is entered by digital switch DS and the set switch SS is depressed (step 166) to change the discount unit price when a sale with a throw-in is made or a coupon is issued upon the purchase of products in large quantity. Thereafter, the operation of step 169 and subsequent steps is performed. The input data is stored at the mode address 8 and at the column address 0. Data of "1" is stored at corresponding addresses of the addresses 1 to n of the mode address 8 for the columns storing the products subjected to discount sales upon a win with the roulette wheel or a large quantity purchase. Data of "0" is stored for the other columns.

When the consumer has a win on the roulette wheel and is given a throw-in, the item input mode switch M2 is depressed to access the mode address 9, thereby setting the apparatus in the throw-in sale mode. Data "1" is set at the corresponding column addresses for the columns subjected to the throw-in sale. The vending machine performs the discount sale in accordance with the data stored in the management table T1.

The respective item input operations in the item input mode have been described above.

An operation will be described wherein the total sales data and the total sold product number data which are stored in the management table T1 are reset, and the number of products stored in each column is set to a stock number.

Figure 9:
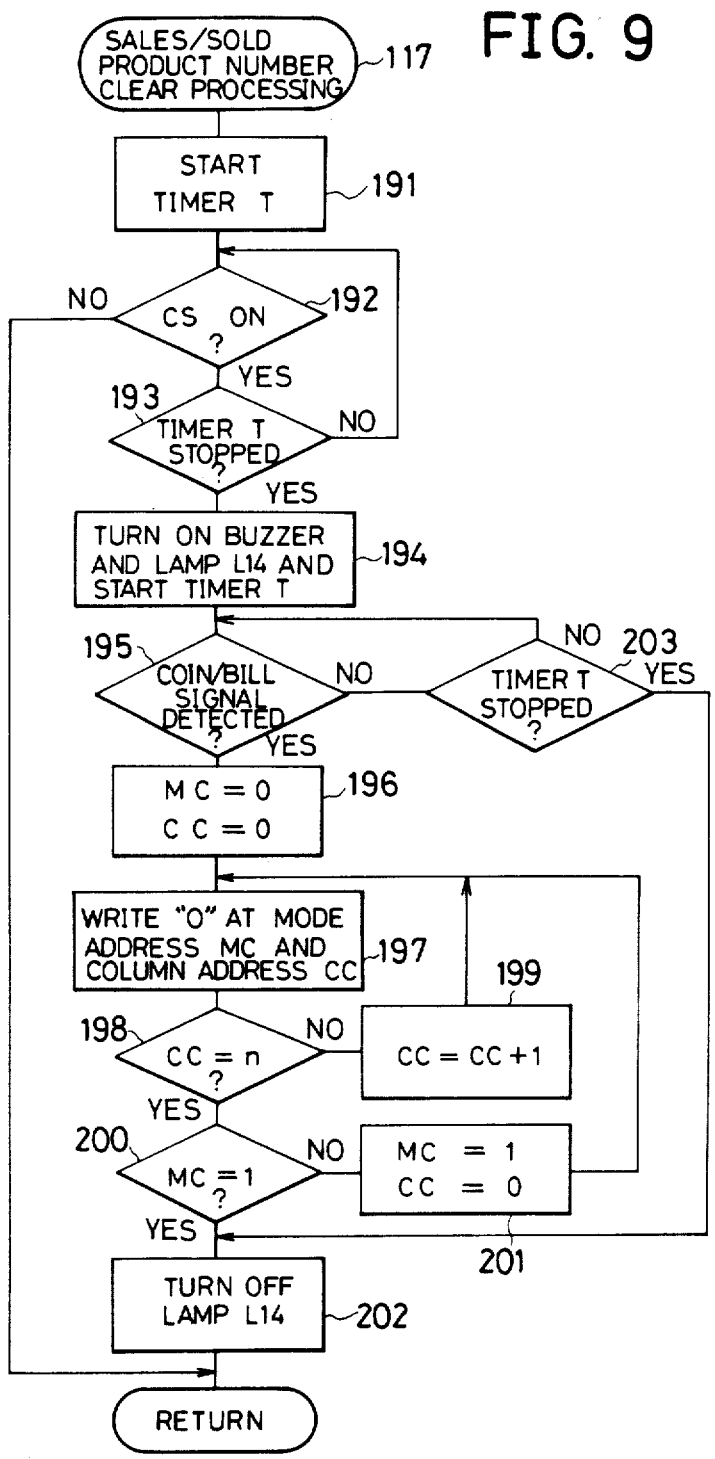
FIG. 9 is a flow chart showing a total sales/sales number clear processing subroutine.

FIG. 9 shows a subroutine for resetting the total sales data and the total sold product number data which are stored in the management table T1. In the standby mode of the main routine of FIG. 4, when the clear switch CS is depressed to clear the total sales data and the total sold product number data (step 108), the total sales/total sold product number clear subroutine shown in FIG. 9 is initiated. The CPU 1 causes the timer T to start (step 191). When the clear switch CS is released before the timer T is stopped (e.g., one second), the flow returns to the main routine in FIG. 4. However, when the clear switch CS is kept depressed until the timer T is stopped, the buzzer generates a sound; at the same time, the indicator lamp 14 is turned on, and the timer T is started (steps 192 to 194). When the signal is supplied from the coin mechanism CN after the timer T is stopped (steps 195 and 203), the indicator lamp 14 is turned off, and the flow returns to the main routine (step 202). However, when the signal is supplied from the coin mechanism CM, the flow advances to step 196 and thereafter. However, the decision step 195 may be omitted. In this case, the flow directly advances from step 194 to step 196. However, according to this embodiment, in order to prevent the total sales data from being deleted, the clear operation is started when a coin is inserted in the vending machine after the clear switch CS is depressed.

In step 196, the counts of the mode counter MC and the column counter CC are set to "0", the total sales data is cleared from a memory area, or data "0" is written in this memory area at the mode address 0 and at the column address 0 of the management table 1 (step 197). The CPU 1 checks in step 198 whether or not the count of the column counter CC has reached the maximum column number n. If NO in step 198, the count of the column counter CC is incremented by one. Data of "0" is written in the column address and the mode address which are accessed by the counts (=0) of the column counter CC and the mode counter MC (steps 198, 199 and 197). The column address is incremented one by one to clear all the data (the total sales data) at all the column addresses and at the mode address 0.

When the total sales data of the vending machine and the individual sales data of the respective columns are cleared, and the count of the column counter CC corresponds to the maximum column number n, the CPU 1 checks in step 200 whether or not the count of the mode counter MC is set to "1". If NO in step 200, the count of the column counter CC is reset to "0" in step 201. The operations in steps 197, 198 and 199 are repeated to reset the total sold product number data to zero. When the count of the column counter CC has reached the maximum column number n and the count of the mode counter MC is set to "1", the indicator lamp 14 is turned off (step 202). The total sales data/total sold product number data processing is ended, and the flow returns to the main routine.

Figure 10:
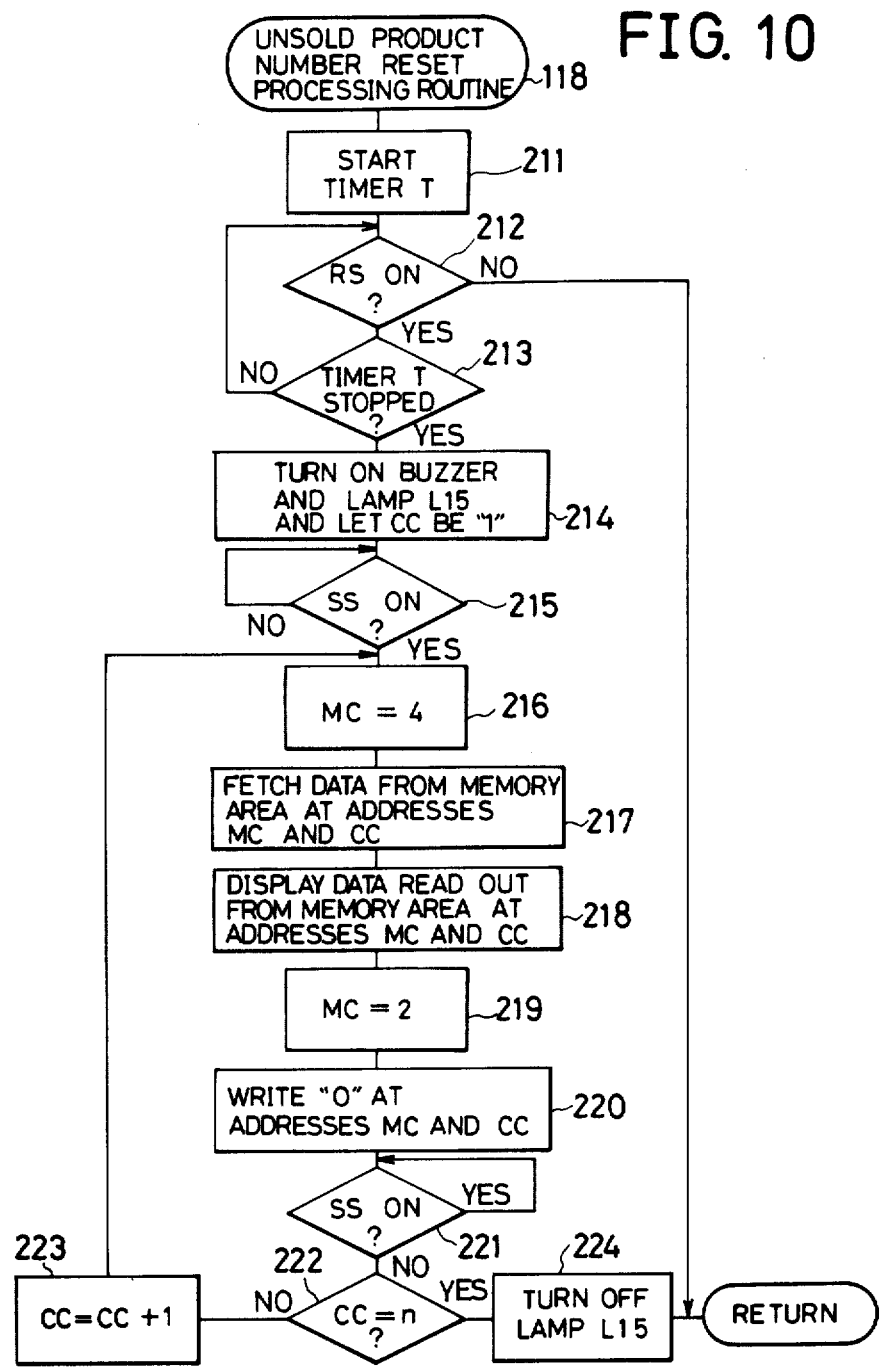
FIG. 10 is a flow chart showing an unsold product number reset processing subroutine.

The unsold product number reset operation will be described hereinafter. When the reset switch RS is depressed, the CPU 1 causes the timer T to start, as shown in FIG. 10. When the reset switch RS is released before the timer T is stopped, the flow returns to the main routine of FIG. 4. However, when the reset switch RS is kept depressed until the timer T is stopped, the buzzer is operated to generate a sound, the indicator lamp 15 is turned on and the count of the column counter CC is set to "1" (steps 211 to 214). The CPU 1 waits until the set switch SS is depressed (step 215). When the set switch SS is depressed, the count of the mode counter MC is set to "4". The unsold product number data of the column designated by the column counter CC are sequentially read out from a memory area at the mode address 4 and the corresponding column addresses; the sequentially updated column numbers are displayed on the column display unit CDP, and the corresponding readout data are sequentially displayed on the data display unit NDP (steps 216 to 218). The count of the mode counter MC is then reset to "2". The readout data designated by the mode address 2 and the count of the column counter CC are stored in a stock number memory area at the mode address 2 (step 220). The CPU 1 waits until the set switch SS is released. When the set switch SS is released (step 221) and the count of the column counter CC has not reached the maximum column number n (step 222), the count of the column counter CC is incremented by one (step 223). The operation of step 216 and subsequent steps is performed again. When the count of the column counter CC reaches the maximum column number n, the indicator lamp 15 is turned off, and the flow returns to the main routine. The unsold product number data stored at the column addresses of the mode address 4 are stored in the stock number data area at the mode address 2.

When the sales data, the sold product number data and the stock number data are reset, the sales and the sold product number are stored in the vending machine. The stock number is decreased to update the data to represent the current selling conditions.

In the above embodiment, the clear switch CS and the reset switch RS are arranged to reset the sales data and the sold product number data to zero so as to perform stock control. However, these switches CS and RS need not be provided. Instead, the digital switch DS and the set switch SS can be used to set the sales data and the sold product number data to zero in accordance with the item input mode processing of FIG. 8. In this case, the stock numbers of the respective columns can be set at numbers of products stored in the respective columns, respectively. More particularly, in step 161 of FIG. 4, let the count of the mode counter be "0" and the count of the column counter be "0". The CPU 1 checks in step 178 and 183 whether the count of the mode counter MC is set to 2, 5, 7 or 8. Data of "0" representing the stock number is entered by the digital switch DS, and the set switch SS is depressed each time the stock number for each column is entered. Therefore, the sales data and the sold product number data which are stored in the management table T1 are reset to zero, and the stock number is regarded as the number of products stored in each column, thereby easily updating the subsequent sales figures.

The failure check/cancel mode operation will be described hereinafter.

When the CPU 1 detects a failure of the vending machine system, the coin mechanism CM and the bill verifier BV, and a decrease in voltage of the battery, indicator lamps L10 to L13 are turned on. The failure numbers corresponding to the failure positions are stored in the system failure table T2, the CM failure table T3 and the BV failure table T3 shown in FIGS. 3C and 3D. At the same time, the system failure flag, the CM failure flag and the BV failure flag are set to logic "1".

Figure 11:
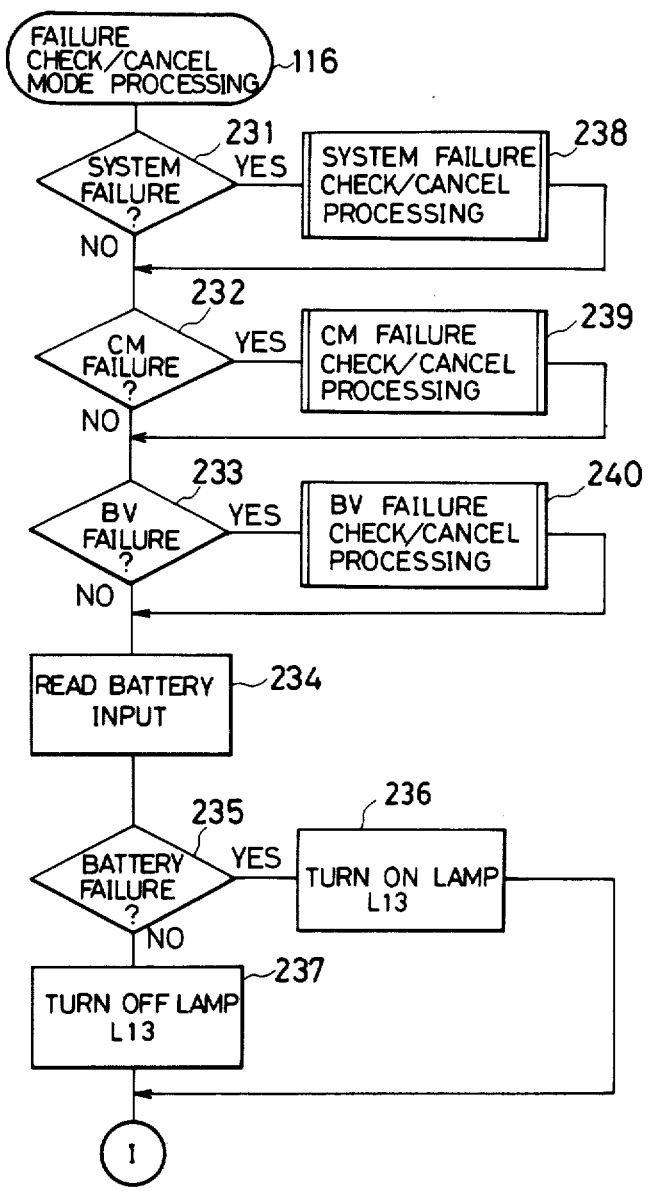
FIG. 11 is a flow chart showing a failure check/cancel mode processing subroutine.

When the lamps L10 to L13 are turned on and the operator depresses the failure check/cancel mode switch M3 (step 107), the CPU 1 performs operations in accordance with failure check/cancel mode processing of FIG. 11. The CPU 1 fetches the system, CM and BV failure flags (steps 231 to 233) and checks whether or not these flags are set to logic "1". If YES in steps 231 to 233, system failure check/cancel processing (step 238), CM failure check/cancel processing (239) and BV failure check/cancel processing (240) are respectively performed. However, if NO in steps 231 to 233, the CPU 1 fetches a battery input. When the CPU 1 determines that the battery voltage is abnormally low, the lamp L13 is turned off (steps 235 to 237). The flow returns to the main routine of FIG. 4, and the CPU 1 is held in the standby mode.

Figure 12:
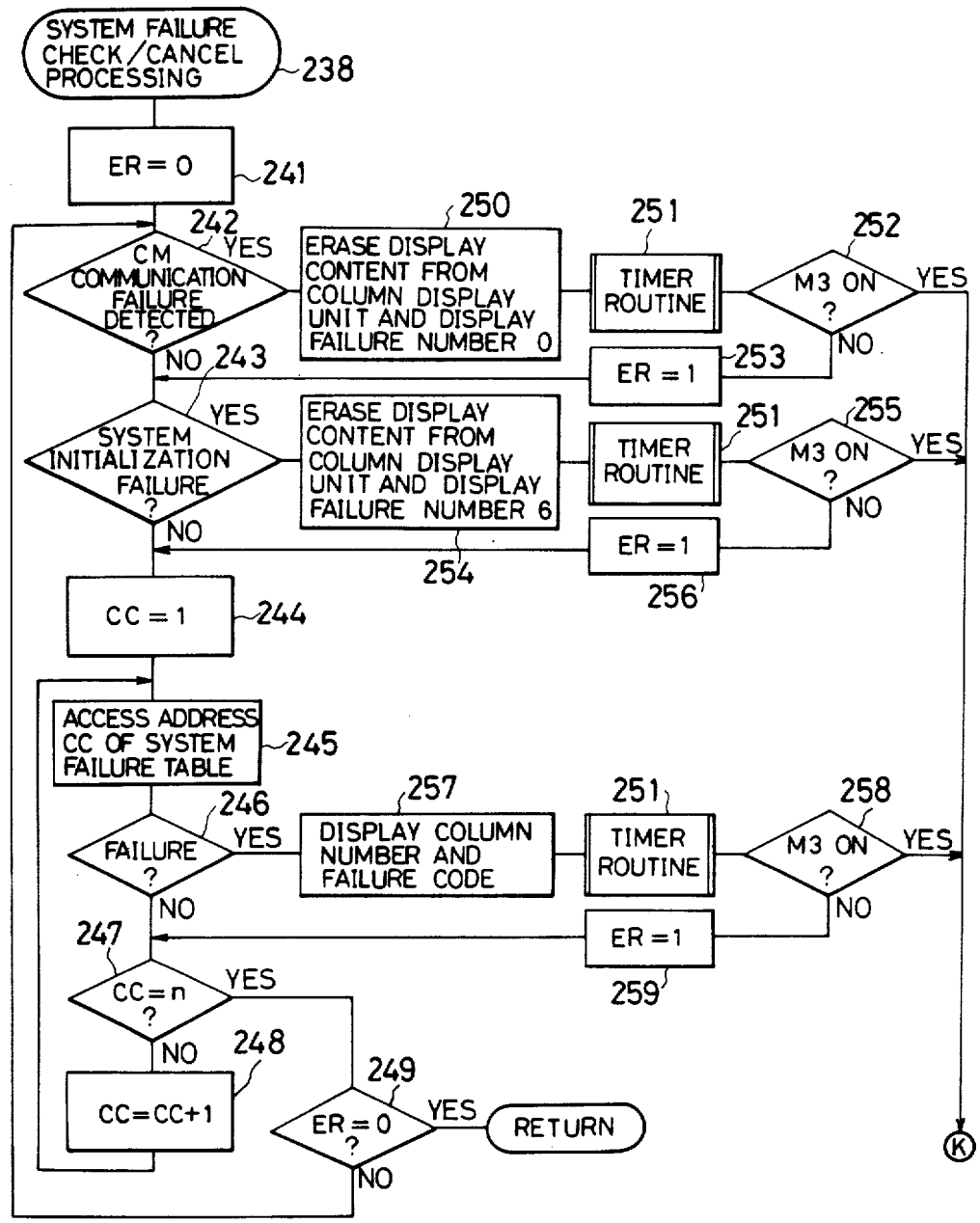
FIGS. 12 and 13 are respectively flow charts showing a system failure check/cancel processing subroutine.

System failure check/cancel processing will be described with reference to FIGS. 12 and 13 when the system failure flag is set to logic "1".

The CPU 1 sets an error flag ER to logic "0" (step 241). The address 0 of the system failure table T2 (FIG. 3B) in the RAM 3 is accessed, and the CPU 1 checks in step 242 whether or not a communication failure with the coin mechanism CM has occurred. If NO in step 242, i.e., when data "0" is stored at the address 0 of the table T2, an address n+1 of the table T2 is accessed so as to check in step 243 whether or not a system failure has occurred. If NO in step 243, the count of the column counter CC is set to "1" (step 244). Data at the address 1 of the system failure table T2 which corresponds to the count of the column counter CC is accessed (step 245). If NO in step 246, the count of the column counter CC is incremented until it has reached the maximum column number n (steps 247 and 248). The operation of step 245 and subsequent steps is performed so that data at the addresses of the system failure table T2 which respectively correspond to the column addresses are read out to check in step 246 whether or not a failure has occurred. When the count of the column counter CC has reached the maximum column number n (step 247) and the failure is detected or corrected to reset the error flag ER to logic "0" (step 249), the flow returns to the main routine. However, if NO in step 249, i.e., the error flag ER is not reset to logic "0", and the operation of step 242 and subsequent steps is performed.

Figure 14:
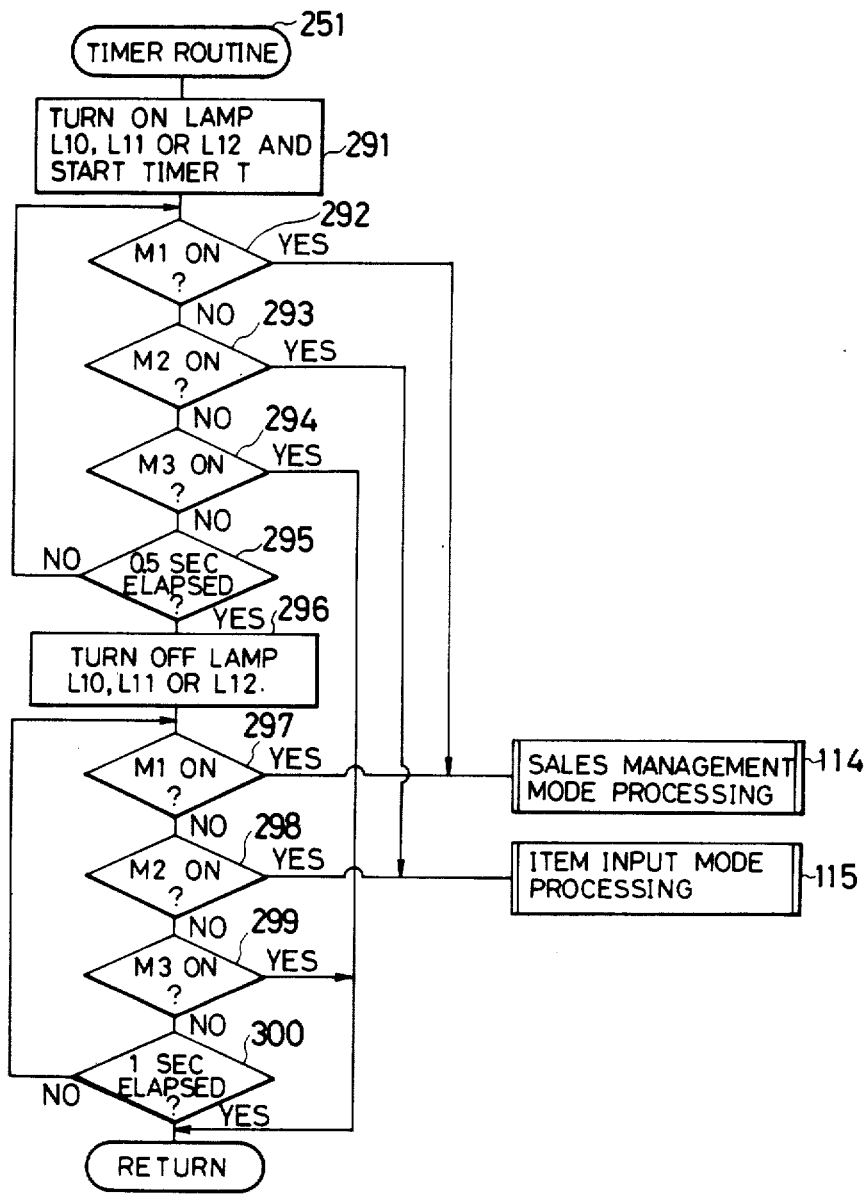
FIG. 14 is a flow chart showing a timer subroutine.

When a communication failure of with the coin mechanism is detected, and the corresponding failure number data is stored in step 242, the CPU 1 causes the column display unit CDP to stop displaying the data and the data display unit NDP to display a failure code "0" (step 250). The flow advances to timer subroutine operation step 251. The timer subroutine is illustrated in FIG. 14. The indicator lamp L10 is turned on to start the timer T (step 291). The CPU 1 then checks in steps 292 and 293 whether or not the mode switches M1 and M2 are turned on. If YES in steps 292 and 293, sales management mode processing and item input mode processing are respectively performed. However, if NO in steps 292 and 293, and the failure check/cancel mode switch M3 is not turned on (step 294), the operations in steps 292 to 295 are performed after the timer T counts a period of 0.5 sec. When the mode switch M3 is depressed, the timer routine processing is restarted, and processing shown in FIG. 12 is initiated. However, none of the mode switches M1, M2 and M3 is depressed within 0.5 sec., the CPU 1 causes the indicator lamp L10 to turn off (step 296). The CPU 1 then checks in steps 297 to 300 whether or not the mode switches M1, M2 and M3 are depressed. When the mode switch M3 is depressed or the time period of one second set in the timer T has elapsed, the timer routine processing is completed, and the flow returns to the processing of FIG. 12. When the mode switch M1 or M2 is depressed before one second has elapsed, sales management mode processing or item input mode processing is performed in the same manner as described above. The indicator lamp 10 flashes in the timer routine. When the timer operation step 251 is completed, the flow returns to the processing of FIG. 12. When the mode switch M3 is turned on (step 252), the next failure cancel processing shown in FIG. 14 is started. However, when the mode switch M3 is released, the error flag ER is set to logic "1" (step 253) and the operation of step 243 and subsequent steps is performed. When a system failure is detected (step 243), the same operation as the CM communication failure detection is performed (steps 254, 251, 255 and 256), except that the failure number "6" is displayed on the data display unit NDP.

When a column failure is detected in step 246, the corresponding column number (i.e., the count of the column counter) is displayed on the column display unit CDP, and the corresponding failure number among the failure numbers 1 to 5 is read out from the system failure table and is displayed on the data display unit (steps 257). Thereafter, the same operations as in the CM communication failure processing are performed (steps 251, 258 and 259). As a result, the CPU 1 detects a CM communication failure (step 242), a system failure (step 243) or a column failure (step 246). At the same time, when the mode switches M1, M2 and M3 are not depressed (steps 252, 255 and 258), the error flag ER is set to logic "1" (steps 253, 256 and 259). The CPU 1 fetches the logic "1" of the error flag ER (step 249), and the operation of step 242 and subsequent steps is repeated. As a result, the indicator lamp L10 flashes. The failed column number and the corresponding failure number are displayed on the column display unit CDP and the data display unit NDP, respectively. In this manner, the operator can visually check the failure position.

Figure 13:
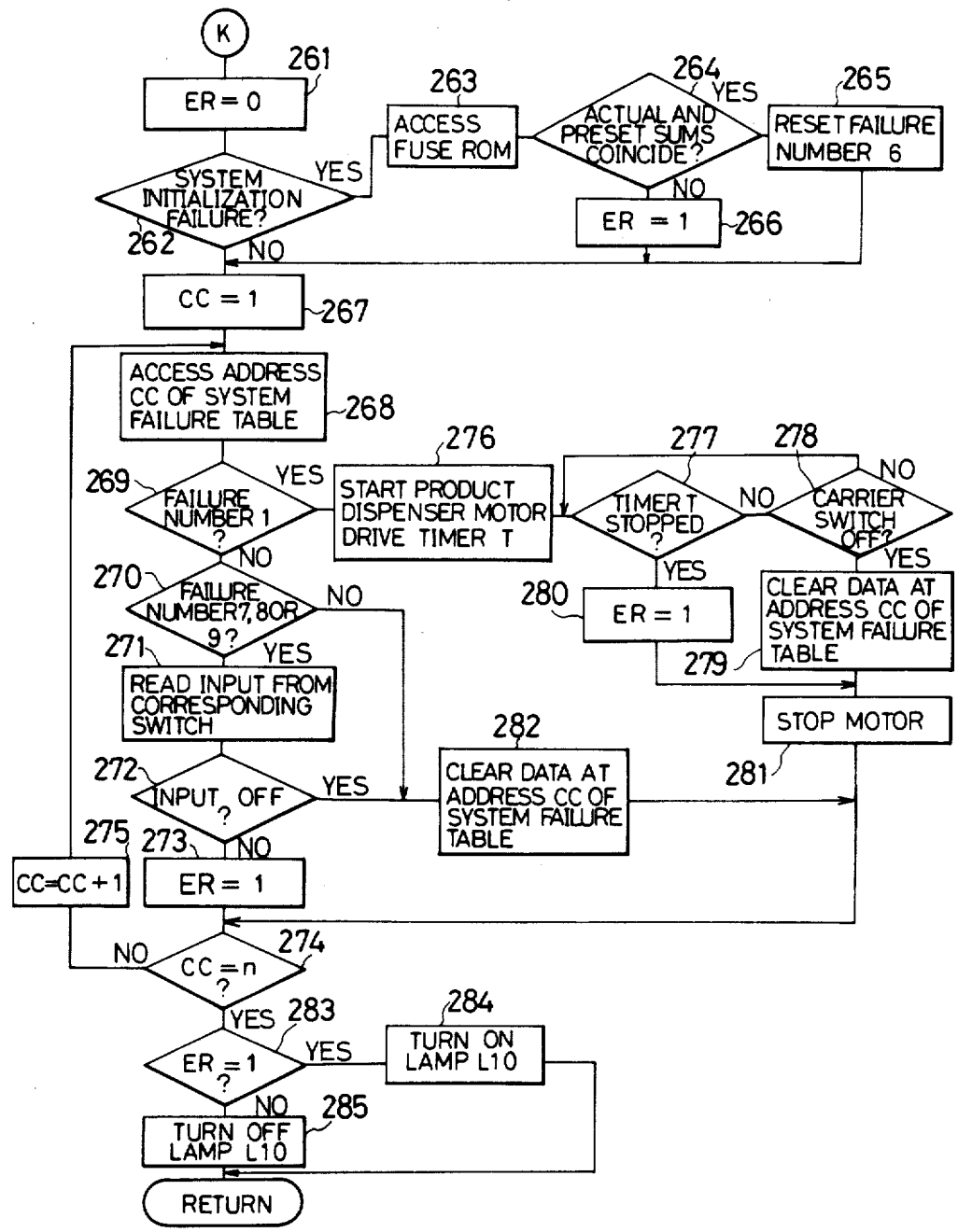

When the operator depresses the mode switch M3 (steps 252, 255 and 258), the CPU 1 performs the operation in accordance with the system failure cancel processing routine shown in FIG. 13. This routine is used to automatically cancel the failure check of the vending machine or to check a failure position again to confirm that the failure position has been already cancelled.

The CPU 1 causes the error flag ER to be set to logic "0" (step 261). When a system initialization failure occurs (step 262), the fuse ROM in the vending machine is accessed (step 263). The data stored at all addresses of the fuse ROM are added to each other, and the sum is compared with a preset address in the fuse ROM. If a coincidence between the actual sum and the preset sum is established (step 264), the failure has already been corrected. The data stored at the address n+1 of the system failure table T2 is deleted and the failure number "6" is cleared (step 265). However, if coincidence is not established in step 264, the error flag ER is set to logic "1" (step 266), and the flow advances to step 267. The preset sum is obtained as a sum of data when normal operation is performed. Status data of the respective components of the vending machine are stored at the addresses. When a failure occurs, the data at the corresponding address changes. In step 267, the count of the column counter CC is set to "1", and the data at the addresses of the system failure table which correspond to the counts of the column counter CC is read out (step 268). The CPU 1 checks in steps 269 and 270 whether or not the failure numbers 1 to 5 and the failure numbers 7 to 9 are stored at these addresses, respectively, (steps 269 and 270). When the failure number 1 is stored at the address, the operation of step 276 and subsequent steps is performed. However, when the failure numbers 7, 8 and 9 are stored in the addresses, the CPU 1 checks whether or not the flag switch, the delivery switch, and the shoot switch (see Table 1) which respectively correspond to the failure numbers 7, 8 and 9 are turned off (step 272). If YES in step 272, the corresponding failure number at the address, of the system failure table T2 is cleared (step 282). However, if NO in step 272, the error flag ER is set to logic "1" (step 273). When the failure numbers 2, 3, 4 and 5 are not detected (step 270), the failure numbers at the corresponding addresses of the system failure table T2 are cleared (step 282). The failure numbers 2, 3, 4 and 5 are used to detect only failures, and cannot be used to cause the controller to detect the failure positions.

The operation between steps 268 to 273 is performed until the count of the column counter CC has reached the maximum column number n (steps 274 and 275), thereby detecting failures in units of columns. When the failure number 1 is detected (step 269), a product jam has occurred (see Table 1). A product dispensing motor is driven and at the same time the timer T is started (step 276). The CPU 1 checks in steps 277 and 278 whether or not a carrier switch for detecting dispensing of the products is kept off until the timer T is stopped. When the carrier switch is kept on until the timer T is stopped, the error flag ER is set to logic "1" (step 280), and the motor is stopped (step 281). The flow then advances to step 274. When the OFF state of the carrier switch is detected before the timer T is stopped, the product jam has been corrected. The failure number 1 stored at the corresponding address of the system failure table is cleared (step 279), and the flow advances to step 281 and the subsequent steps.

The failure number is displayed, and the failure cancel operation is performed until the count of the column counter CC is the maximum column number n. When the error flag ER is set to logic "1", the CPU 1 causes the indicator lamp L10 to turn on. When the error flag ER is set to logic "0", the CPU 1 causes the indicator lamp L10 to turn off (steps 283 to 285). System failure check/cancel processing is thus ended, and the flow returns to failure check/cancel mode processing.

Figure 15:
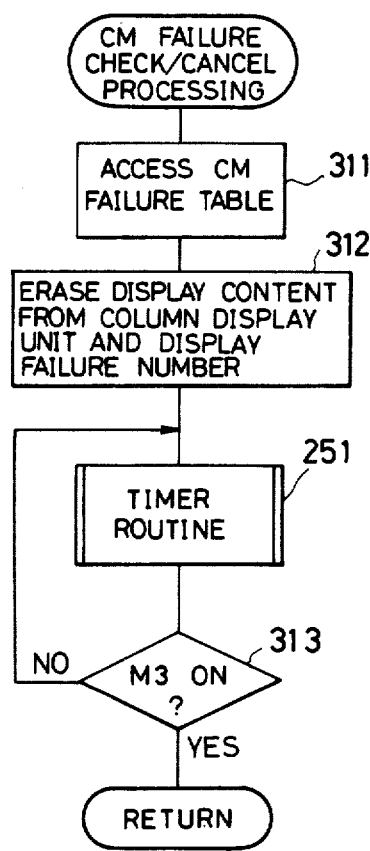
FIG. 15 is a flow chart showing a CM failure check/cancel processing subroutine.

Coin mechanism failure check/cancel processing will be described with reference to FIG. 15.

Figure 16:
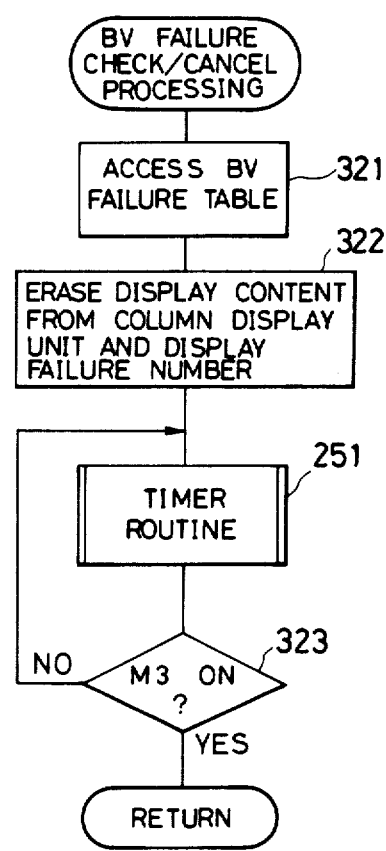
FIG. 16 is a flow chart showing a BV failure check/cancel processing subroutine.

When the coin mechanism failure flag is set to logic "1" (step 232 in FIG. 11), the CPU 1 accesses the CM failure table (FIG. 3C) in the RAM 3 (step 311). Data of "1" (i.e., failure data) is displayed on the data display unit NDP in terms of the failure number, and the data displayed on the column display unit CDP is deleted (step 312). The above-mentioned timer routine operation is performed until the mode switch M3 is depressed, causing the lamp L11 to flash. When the mode switch M3 is depressed, the flow returns to the routine of FIG. 11. Even when failure data of the bill verifier BV is stored, the operation can be performed in the same manner as the CM failure check/cancel processing, as shown in FIG. 16, except that the BV failure table of FIG. 3D is accessed in step 321, and that the indicator lamp L12 flashes.

What is claimed is:

1. A control apparatus for a vending machine having therein a plurality of columns, comprising:
   storage means for storing sales management data for controlling total selling in the vending machine and selling in each of the columns, said storage means having a failure table for storing failure positions, said sales management data consisting of a plurality of management items which include at least one first management item associated with the entire vending machine and with each colummn, and at least one second management item associated with each column, each of said at least one first management item having a value variable with selling by the vending machine, each of said at least one second management item being variable settable;
   mode selecting means for selecting any one of a management control mode where said at least one first management item is displayed, a setting mode where a value of each of said at least one second management item is settable, and a failure check mode where check is made as to whether a failure occurs;
   column selecting means for selecting any of the entire vending machine and an arbitrary one of the columns;
   management item selecting means for selecting an arbitrary one of management items of the sale management data, said mode selecting means, said column selecting means and said management item selecting means being arranged to be operable by an operator, respectively;
   a column display unit for displaying data indicative of a column selected by said column selecting means;
   a data display for displaying the sales management data;
   control means for reading out from said storage means data associated with the item selected by said management item selecting means and with one of the entire vending machine and the column selected by said column selecting means, to cause said data display unit to display the thus read data and to cause said column display unit to display the data indicative of the selected column when the management control mode is selected, said control means causing said column display unit and said data display unit to display the failure position in accordance with said failure table when the failure check mode is selected; and
   setting means for setting a value of each of the at least one second management item in said storage means, said control means supplying to and storing in said storage means the thus set value asssociated with one of the second management item selected by said management item selecting means and with the column selected by said column selecting means when the setting mode is selected.

2. An apparatus according to claim 1, wherein the sales management data include at least unit prices of products stored in the respective columns.

3. An apparatus according to claim 1, wherein the sales management data include total sales of the vending machine, total sold product number of the vending machine, individual sales of the respective columns and sold product numbers of the respective columns.

4. An apparatus according to claim 3, further comprising sales and sold product number clearing means for clearing sales data and sold product number data which are stored in said storage means.

5. An apparatus according to claim 4, wherein said sales and sold product number clearing means clears the sales data and the sold product number data when a sales and sold product number clear switch is turned on and a coin is inserted in the vending machine.

6. An apparatus according to claim 1, wherein the sales management data include stock numbers of the respective columns.

7. An apparatus according to claim 1, wherein the sales management data include data for designating a column for storing products subjected to continuous selling within a limit of an amount of money inserted in the vending machine.

8. An apparatus according to claim 1, wherein the sales management data include a maximum number which allows continuous selling.

9. An apparatus according to claim 1 or 8, wherein the sales management data include data for designating a column subjected to group selling for equally dispensing products of one type at a single unit price.

10. An apparatus according to claim 1 or 8, wherein the sales management data include data representing the number of products sold at a discount and a discount unit price when the products are purchased in a large quantity.

11. An apparatus according to claim 10, wherein the sales management data include data for designating a column for storing products subjected to the discount sale when the products are purchased in a large quantity.

12. An apparatus according to claim 1 or 8, wherein the sales management data include the number of products which must be bought before a coupon is issued when the products are purchased in a large quantity, and coupon issuance data.

13. An apparatus according to claim 12, wherein the sales management data include data for designating a column for storing the product which when bought in a large quantity result in the issuance of a coupon.

14. An apparatus according to claim 1, wherein the sales management data include data for designating an amount to be discounted when a purchaser has a win on a roulette wheel in a vending machine with a roulette wheel, and data for designating a column for storing products subjected to a throw-in sale.

15. An apparatus according to claim 1, wherein the sales management data include data for designating a column for storing products subjected to a throw-in sale when a purchaser has a win on a roulette wheel in a vending machine with a roulette wheel.

16. An apparatus according to claim 1, wherein said failure table includes a system failure table for storing the failure positions of each column of the vending machine, a failure column being displayed on said column display unit in accordance with data stored in said system failure table, and the failure position being displayed on said data display unit.

17. An apparatus according to claim 1 or 16, wherein said failure table includes a coin mechanism failure table for storing the failure positions of a coin mechanism for receiving/dispensing coins in the vending machine, the failure position being displayed on said data display unit in accordance with said coin mechanism failure table.

18. An apparatus according to claim 1, wherein said failure table includes a bill verifier failure table for storing the failure positions of a bill verifier arranged in the vending machine, the failure position being displayed on said data display unit in accordance with said bill verifier failure table.

* * * * *